United States Patent Office 2,795,435
Patented June 11, 1957

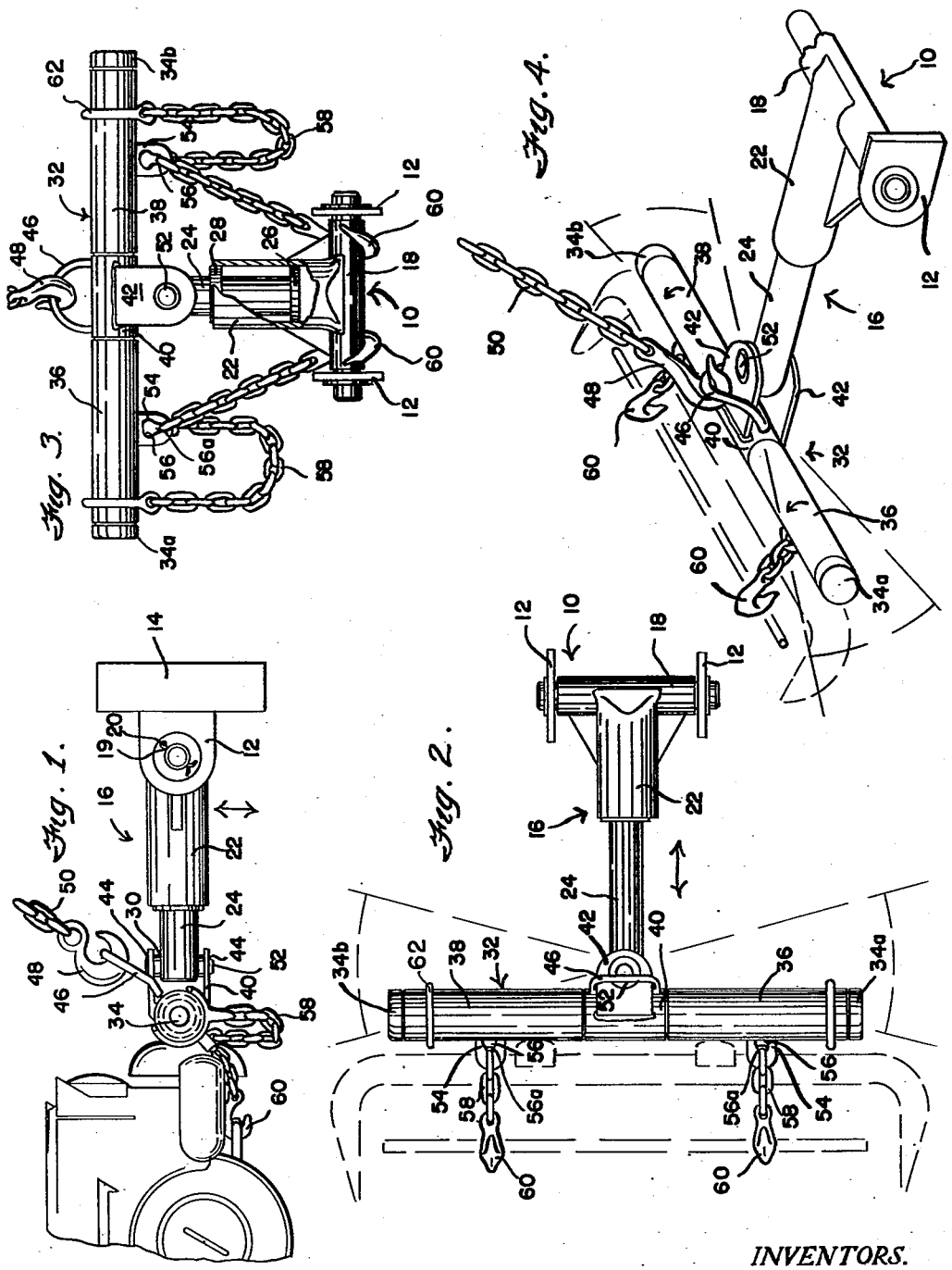

2,795,435

VEHICLE TOWING DEVICE

Philip J. Ortiz and Arthur W. Ortiz, Hawthorne, N. Y.; said Arthur W. Ortiz assignor to Philip J. Ortiz Application February 6, 1956, Serial No. 563,693

9 Claims. (Cl. 280—446)

This invention relates to a vehicle towing device and more particularly to a tow bar mounted on a tow truck and utilized for towing disabled cars or the like.

An object of the present invention is to provide a towing device incorporating a tow bar which is pivotable, rotatable and movable out of its own plane. The tow bar in accordance with the present invention is capable of pulling a disabled vehicle to a selected and predetermined distance from the tow truck and then lifting the vehicle to a desired height for towing purposes.

Another object of the present invention is to provide a locking device for a chain coupling the disabled vehicle to the towing device, said chain being automatically and positively locked in said locking or retaining device.

Another object of the present invention is a towing device which may be extended from the rear of a tow truck when in use yet due to the telescoping feature of construction folds up flat and compact against the tail of the tow truck.

Another object of the present invention is to provide a simplified towing device which although it contains relatively few parts is rugged in construction and effective for the purposes intended. It should be noted that larger size towing devices in accordance with the present invention may be manufactured for use with trucks and other heavy vehicles.

A further object of the present invention is to provide a tow bar which is pivoted at a point adjacent to the front end of the disabled vehicle, the supporting member for the tow bar being immovable laterally, thus preventing dangerous lateral swinging or "whip-action" of the towed vehicle.

Still another object of the present invention is the provision of a vehicle towing device which may be rapidly and easily brought into operative position and coupled to a disabled vehicle.

The above and other features, objects and advantages of the present invention will be fully understood from the following description considered in connection with the accompanying drawing in which:

Fig. 1 is a side elevational view of the vehicle towing device embodying our invention;

Fig. 2 is a top plan view thereof;

Fig. 3 is a front elevational view thereof with the towing device being partially cut-away and the device in an inoperative position folded flat against the tail of a tow truck and, Fig. 4 is a perspective view of our device with the telescoping sections in extended position.

Referring more particularly to the drawing, the device in accordance with our present invention is preferably mounted on the rear of a service or tow truck for lifting and towing a disabled automobile or other vehicle. Thus, a support referred to generally by the reference numeral 10 preferably comprises a pair of spaced, apertured ears 12 on the tail 14 of a tow truck. An elongated member referred to generally by the reference number 16 has a short tubular end portion 18 located transverse to the elongated member 16 but of a particular dimension to have the ends thereof properly fit in the apertures of ears 12. Cotter pins 20 are inserted through the openings 19 in the ends of tubular end portion 18. Thus, the present construction pivotally mounts the elongated member on the support for movement in a generally vertical plane.

The elongated member 16 comprises an outer tubular section 22 and a telescoping inner tubular section 24. The inner tubular section 24, which is movable within outer section 22, is provided with an annular flange or collar 26 while the outer tubular section is provided with an annular stop 28 at the point where the bore of the section is reduced in cross-sectional area (see Fig. 3). Thus, the extension of the inner tubular section 24 is limited by this arrangement and the two sections may not be disengaged. The inner tubular section 24 is further provided with an end portion remote from the tow truck having a preferably integral tube 30 extending in a direction transverse to the inner tubular section 24.

The tow bar itself is referred to generally by the reference numeral 32 and is secured to the elongated member by a manner hereinafter described. The tow bar comprises a rod 34, sleeves 36 and 38 rotatable thereon, and an attachment element 40 located between the sleeves and provided with preferably integral ears 42 having apertures 44. The rod 34 has flanges 34a and 34b at opposite ends to contain the sleeves 36 and 38 as well as the attachment element 40 on the rod. Additionally, loosely fixed to attachment element 40 is a U-shaped connecting part 46 to which the hook 48 of the hoist 50 is connected. The U-shaped connecting part 46 has its legs sprung into retaining means (not shown) on the upper ear 42 thereby permitting the connecting part 46 to pivot in a plane transverse to the rod 34. This connecting part 46 has a portion which is offset so that the hook 48 of the hoist 50 will not rub against and mar the bumper and front end of the towed vehicle under any condition.

The tow bar is connected to the elongated member by means of a pin 52 inserted through the apertures 44 of ears 42. This arrangement permits the tow bar to move in a generally horizontal plane and also in a plane transverse to the elongated member with the latter as a central axis.

Each sleeve 36 and 38 has a locking member 54 having a key-hole shaped aperture 56. A chain 58 is retained in each aperture and couples the tow bar to the undercarriage or A-frame of an automobile or other vehicle. Upon securing the hook 60 to the frame of the automobile the coupling chain 58 drops by gravity into the reduced portion 56a of the key-hole shaped aperture 52. At the other end of each chain 58 is a ring 62 which fits loosely over the ends of sleeves 36 and 38 respectively.

It should be noted that since the tow bar may be moved up and down (Fig. 1); moved towards and away from the tow truck (Fig. 2); pivoted about the inner tubular section 24 (Fig. 2); and rotated about the latter as an axis (Fig. 4); that the towing device may be easily and rapidly utilized in a multitude of situations where existing devices would not work or could only be used with great difficulty. For example, our towing device may be employed to elevate and tow vehicles out of ditches and to hook up to automobiles whose damaged front ends are irregular being, for instance, higher on one side and lower on the other side which would otherwise be extremely difficult to connect up.

Our vehicle towing device is operated as follows: The tow truck is backed up to the damaged vehicle. It is not necessary that the truck be spaced a particular distance from the front end of a damaged vehicle since the telescoping inner section 24 of the elongated member 16 may be extended manually to a location where the tow bar may abut the vehicle bumper. Coupling chains 58 are hooked up to the frame of the vehicle and locked in aperture 56. The hook 48 of the hoist 50 being connected to the connecting part 46 when elevated by a motor (not shown) automatically retracts the telescoping inner section 24 as far as it will go (see Fig. 4 for extended position and Fig. 1 for retracted position). Thereafter, sequentially the towing device in its entirety is raised together with the damaged vehicle. The elevation of the vehicle towing device may be stopped at any desired height.

It is within the scope of the present invention to manufacture the towing device of heavier gauge metal and of large dimensions for use with trucks and other heavy vehicles. It should be noted that the pivot point of the tow bar is in close proximity to the front end of the towed vehicle thus preventing dangerous lateral sway and "whipping action" of the towed vehicle while the rotatable sleeves 36 and 38 permit the proper chain coupling of the damaged vehicle.

When our novel towing device is not in use then it may be folded flat against the tail of the tow truck and extending in a generally vertical direction as seen in Fig. 3. In that case, the device projects only a very short distance from the tail of the truck and forms a compact, unobtrusive arrangement.

While we have shown and described the preferred embodiment of our invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What we claim is:

1. A vehicle towing device comprising support means mounted on a towing vehicle, an elongated member pivotally secured to said support means and provided with at least two telescoping sections, a cross piece, means pivotally connecting said cross piece to one of said telescoping sections at a point remote from said towing vehicle, said cross piece pivoting at least in a plane substantially parallel to said elongated member, at least one rotatable sleeve on said cross piece, means for coupling a disabled vehicle to said cross piece by means of said rotatable sleeve, and a tension member operatively connected to said cross piece whereby upon the application of lifting force to said tension member said telescoping sections are retracted and the latter together with the cross piece are elevated.

2. A vehicle towing device comprising support means mounted on a towing vehicle, an elongated member pivotally secured to said support means and provided with two interfitting, telescoping sections, a cross piece, means pivotally connecting said cross piece to the inner telescoping section at a point remote from said towing vehicle, said cross piece pivoting at least in a plane substantially parallel to said elongated member, at least one rotatable sleeve on said cross piece, means for coupling a disabled vehicle to said cross piece by means of said rotatable sleeve, a tension member operatively connected to said cross piece whereby upon the application of lifting force to said tension member said telescoping sections are retracted and the latter together with the cross piece are elevated.

3. A vehicle towing device as set forth in claim 2 wherein said outer telescoping section is provided with a projection on the inner periphery thereof and the inner telescoping section is provided with a shoulder on the outer periphery thereof whereby said shoulder engages said projection upon extension of the inner telescoping section of said elongated member to a given position.

4. A vehicle towing device comprising support means mounted on a towing vehicle, an elongated member pivotally secured to said support means and provided with at least two telescoping sections, a tubular cross piece, means pivotally connecting said cross piece to one of said telescoping sections at a point remote from said towing vehicle, said cross piece pivoting at least in a plane substantially parallel to said elongated member, at least one rotatable sleeve on said cross piece, means for coupling a disabled vehicle to said cross piece by means of said rotatable sleeve including a chain, and a locking member for said chain on said sleeve having an elongated slot with a reduced portion directed downwardly whereby a part of said chain falls by gravity into said reduced portion to securely retain said chain in said locking member, and a tension member operatively connected to said cross-piece for elevating said towing device upon the application of lifting force to said tension member.

5. A vehicle towing device comprising support means mounted on a towing vehicle, an elongated member pivotally secured to said support means and provided with at least two telescoping sections of circular cross section, a cross piece, means pivotally connecting said cross piece to one of said telescoping sections at a point remote from said towing vehicle, said cross piece pivoting in a plane substantially parallel to said elongated member and rotatable about said elongated member as the axis of rotation, at least one rotatable sleeve on said cross piece, means for coupling a disabled vehicle to said cross piece by means of said rotatable sleeve, and a tension member operatively connected to said cross piece whereby upon the application of lifting force to said tension member said telescoping sections are retracted and the latter together with the cross piece are elevated.

6. A vehicle towing device as set forth in claim 1 wherein said tension member is a U-shaped element secured to said cross-piece, the legs of said U-shaped element being bent to locate the bight of said element laterally relative to said cross piece.

7. A vehicle towing device as set forth in claim 4 wherein one end of said chain is provided with a ring of a dimension to loosely fit over said rotatable sleeve.

8. A vehicle towing device comprising support means mounted on a towing vehicle, an elongated member pivotally secured to said support means and provided with at least two telescoping cylindrical sections, a tubular cross piece, means pivotally connecting said cross piece to one of said telescoping sections at a point remote from said towing vehicle, said cross piece pivoting at least in a plane substantially parallel to said elongated member, a pair of sleeves rotatable on said cross piece, a locking member on each of said sleeves, a chain for each of said locking members whereby a disabled vehicle is coupled to said cross piece by means of said rotatable sleeves, and a tension member operatively connected to said cross piece whereby upon the application of lifting force to said tension member said telescoping sections are retracted and the latter together with the cross piece are elevated.

9. A vehicle towing device as set forth in claim 8 wherein said means pivotally connecting said cross piece to one of said telescoping sections is a pivot pin secured to the inner telescoping cylindrical section and positioned at right angles to said cross piece.

References Cited in the file of this patent

UNITED STATES PATENTS

| 1,690,372 | Livesay | Nov. 6, 1928 |
| 2,512,635 | Flowers | June 27, 1950 |
| 2,555,663 | Schouboe | June 5, 1951 |
| 2,712,877 | Wiley | July 12, 1955 |